United States Patent [19]
Araki

[11] 3,782,261
[45] Jan. 1, 1974

[54] DATA TRANSMISSION DEVICE FOR USE WITH INTERCHANGEABLE-LENS-CAMERAS

[75] Inventor: Kunihiko Araki, Yokohama, Japan

[73] Assignee: Ricoh Co. Ltd.,, Tokyo, Japan

[22] Filed: Apr. 11, 1972

[21] Appl. No.: 243,033

[30] Foreign Application Priority Data

Apr. 16, 1971 Japan ................................ 46-23873

[52] U.S. Cl. .................... 95/45, 95/64 R, 350/25 T
[51] Int. Cl. ............................................ G03b 3/00
[58] Field of Search .................... 95/64 R, 64 B, 45; 350/252, 257

[56] References Cited

UNITED STATES PATENTS 3,354,805 11/1967 Prochnow .............................. 95/45

*Primary Examiner*—John M. Horan
*Assistant Examiner*—Richard A. Wintercorn
*Attorney*—Henry T. Burke et al.

[57] ABSTRACT

A device for exchanging information, such as exposure data, between a camera body and an interchangeable lens mounted thereon. The device provides accurate data exchange even when the machining tolerances of the camera mount and the lens mount are eased. The device includes an annular surface on the camera mount which has a uniform circular array of data transmission elements. Each of the data transmission elements is biased towards a projected position in which it sticks out of the camera mount annular surface, but can be pushed into a retracted position. The lens mount has a corresponding annular surface which is provided with one or more arcuate grooves adapted to receive loosely selected data transmission elements when the lens is mounted in its final position on the camera. Thus, when the lens is mounted on the camera, selected data transmission elements are received in the groove or grooves and thus remain in their projected position, while other data transmission elements are pushed into their retracted position by the annular surface of the lens mount. The data transmitted between the camera and the lens is determined by the particular combination of retracted and projected data elements when a lens is mounted on the camera. Because of the digital nature of the data exchange, the machining tolerances of the camera mount and the lens mount may be eased, since each of the circumferential edges of the grooves in the lens can be anywhere between particular data transmission elements when the lens is in its final position on the camera, so long as it does not overlap the outline of an element which must remain in its projected position. With eased machining tolerances, the cost of producing cameras with interchangeable lenses can be reduced substantially without sacrificing quality.

7 Claims, 5 Drawing Figures

DATA TRANSMISSION DEVICE FOR USE WITH INTERCHANGEABLE-LENS-CAMERAS

BACKGROUND OF THE INVENTION

The invention relates to devices for data exchange between a camera body and an interchangeable lens mounted thereon. The data which is exchanged between the camera and the lens may be data relating to exposure parameters.

There are prior art cameras in which it has been possible to exchange data between the camera body and an interchangeable lens mounted thereon. For example, it has been possible to convey from the interchangeable lens to the camera exposure data such as aperture, the distance from the camera lens to a subject, etc., and it has been possible to convey from the camera body to the lens exposure information such as optimum aperture, shutter speed and the like.

Prior art devices for such data exchange between a camera and an interchangeable lens mounted thereon include data transmission members which are secured to the camera or to the interchangeable lens which rotate about the optical axis or move in parallel with the optical axis. The displacement of these members as the lens is mounted on the camera represents the data which is to be conveyed.

It should be appreciated that when the displacement of a data transmitting member is representative of the data conveyed thereby, it is necessary that the data transmitting member and associated mechanisms be machined to a high tolerance, and it is necessary that the camera mount and the lens mount mating therewith be also machined to a high degree of tolerance so that the final position of the lens on the camera is in perfect registration with the data transmitting members. It should also be appreciated that the necessity to machine members and associated mechanisms to high tolerance is expensive, and that the necessity for high tolerance machining may be compensated, but that such compensation also increases production costs. It is desirable to provide devices for accurate and reliable data exchange between a camera body and an interchangeable lens mounted thereon, but it is also desirable to do so at minimum manufacturing cost.

SUMMARY OF THE INVENTION

The invention relates to a device for exchanging information, such as exposure data, between a camera body and an interchangeable lens mounted thereon. One of the objects of the invention is to provide accurate exchange of information without the necessity of high machining tolerances.

The invented device relies on exchange of digital data, as opposed to the exchange of analogue data, which has been done in the prior art. In particular, the invented device includes an array of data transmitting elements carried by the camera mount. Each of the data transmitting elements is biased to project from the camera mount, but can be pushed into a retracted position. The mating mount on the interchangeable lens has a displacing surface which has one or more slots adapted to receive loosely selected data transmitting elements when the lens is mounted on the camera. Thus, when the lens is mounted on the camera, selected data transmitting elements are received loosely in the one or more slots in the displacing surface of the lens mount, while other selected data transmitting elements are pushed into their retracted position. The particular combination of projecting and retracted data transmitting elements resulting when a particular interchangeable lens is mounted on the camera is used as a digital code signifying data transmitted from the particular interchangeable lens mounted on the camera to the camera body. It is appreciated that as an alternative, the data transmitting elements may be mounted on the interchangeable lens and the displacing surface may be on the camera mount, and that still alternatively, some of the data transmitting elements may be mounted on the camera and some on the lens, so as to carry out a two-way data exchange between the camera body and the interchangeable lens mounted thereon.

In one particular embodiment, the camera mount carries a circular array of data transmitting elements which are uniformly spaced from each other and which are biased to project outwardly of the camera mount. The lens mount has a mating displacing surface which is annular in outline and which has one or more arcuate grooves adapted to accept loosely selected data transmitting elements when the lens is mounted on the camera. With the lens mounted on the camera, selected data transmitting elements are received loosely within the one or more arcuate grooves and remain in their projecting positions, while other selected data transmitting elements are pushed inwardly to their retracted position. The particular combination of projecting and retracted data transmitting elements is a digital code signifying data transmitted from the lens to the camera. The particular advantage of the invented data transmitting device is that it operates reliably even when the machining tolerances of the camera mount and of the lens mount are eased to reduce production costs. Mechanical wear in the mechanism for mounting the lens does not have the type of adverse effect which is present in prior art devices for data exchange between a camera body and a lens mounted thereon.

One of the objects of the present invention is therefore to provide an exposure data transmission device for use with cameras having interchangeable lenses, such as lenses of the screw-in type, which device can exchange exposure data between the camera body and the interchangeable lens without being adversely affected by dimensional errors in the lens mounts.

Another object of the invention is to provide a camera of the interchangeable lens type which is inexpensive to manufacture and is capable of accurately exchanging data between the camera body and the interchangeable lens.

Still another object of the invention is to provide a device for data exchange between a camera body and an interchangeable lens mounted thereon in which device the data does not depend on the degree of displacement of a data transmission member, but depend solely upon which data transmitting members are displaced. That is, the invented data transmitting system is digital, as opposed to the analogue data transmitting system of the prior art devices which is highly influenced by dimensional errors in the mounts because data is transmitted in analogue form in response to the relative position between the camera body and the interchangeable lens mounted thereon.

DETAILED DESCRIPTION

Figure 1:
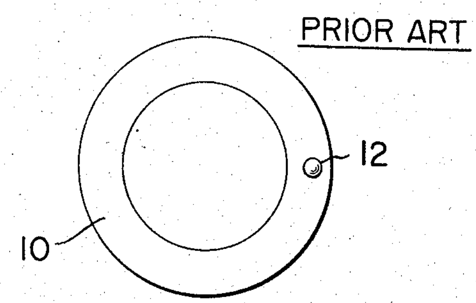
FIG. 1 is a front view of a mount on the side of a camera body of one example of prior art data transmission devices.
Figure 2A:
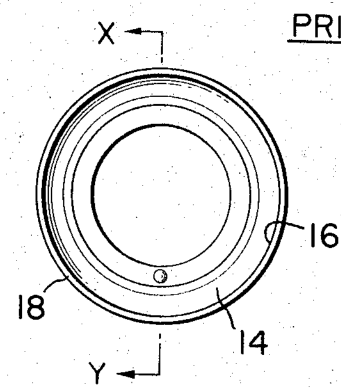
FIG. 2A is a front view of a mount on the side of an interchangeable lens.
Figure 2B:
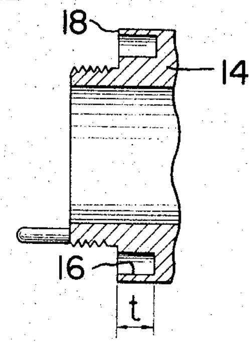
FIG. 2B is a sectional view taken along line X–Y of FIG. 2A.

Prior Art — FIGS. 1, 2A and 2B

FIG. 1 illustrates a mount 10 on the side of a camera body (not shown) of the type where an interchangeable lens is mounted at a predetermined final position with respect to the camera body. A data transmitting pin 12, such as an aperture lever on the side of the camera body, is rotated about the optical axis by an associated data transmitting member or pin (not shown) on the side of the interchangeable lens (not shown), so that exposure data may be transmitted from the interchangeable lens to the camera body. It is appreciated that accurate data exchange depends on the accuracy of the registration between the final position of the interchangeable lens, the camera, and the member 12.

FIGS. 2A and 2B illustrate different devices of this general type. In particular, a mount 14 is provided on the side of an interchangeable lens (not shown) of the screw-in type. In this lens mount, the final angular position of the interchangeable lens with respect to the camera body is unimportant. The mount 14 has a groove 16 whose depth *t* (measured from the front surface of the flange 18 to the bottom of the groove 16) represents a lens parameter, such as maximum aperture F. The depth *t* and the parameter represented thereby is measured by the displacement of an exposure data transmission pin (not shown) on the side of a camera body which pin fits within the groove 16.

In the interchangeable lens mount system shown in FIG. 1, there must be nearly perfect angular registration between the interchangeable lens and the camera body when the lens is mounted in its final position on the camera body and the analogue data transmitting member must have accurate dimensions. For example, a click stop mechanism may be used to define the final position of the lens on the camera body. Because of this requirement for nearly perfect registration and accurate dimensions, the lens mount system must be machined very precisely and this precise machining necessarily results in high manufacturing costs for such mount systems. Because of this requirement for precise machining, the most important feature of the screw-in type mount system, namely, production economy, is lost and the precisely machined screw threads may wear out prematurely and produce play which affects adversely the accuracy of transmitting information between the lens and the camera body.

In the interchangeable mount system shown in FIGS. 2A and 2B, the length of the data transmission pin which fits in the groove 16 is necessarily limited because a long pin will hinder the lens changing operation and will increase the size of the camera body. As a result, the data transmission member and the mechanism associated therewith must be machined to a high degree of dimensional accuracy so that a small displacement of a pin may be detected with satisfactory accuracy. The consequence is that high tolerance and high manufacturing costs cannot be avoided, and any wear of the data transmitting pin or the associated mechanism adversely affects accuracy.

Figure 3:
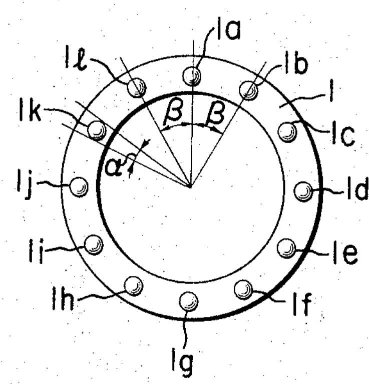
FIG. 3 is a front view of a mount on the side of a camera body of a data transmission device in accordance with the present invention.
Figure 4:
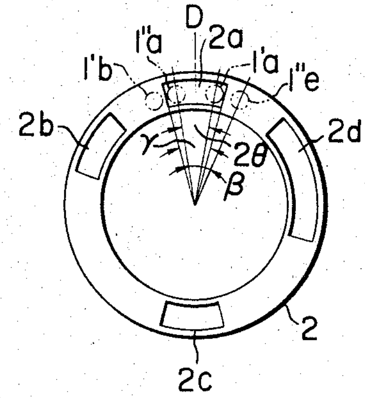
FIG. 4 is a front view of a mount on the side of an interchangeable lens for the camera mount shown in FIG. 3.

The Invention, (FIGS. 3 and 4)

FIG. 3 is a frontal view showing a mount 1 on the side of a camera body (not shown) and FIG. 4 is a frontal view of a mount 2 on the side of an interchangeable lens (not shown). The camera mount 1 and the lens mount 2 include annular surface which mate opposite each other when the lens is mounted at its final position on the camera by means of a conventional screw-in system (not shown).

An array of data transmitting elements 1*a* through 1*l* are arranged around the circumference of the annular surface of the camera mount 1. The data transmitting elements 1*a* through 1*l* are equally spaced from each other and are arranged around the circumference of a circle coaxial with the optical aixs of a lens mounted on the camera. Each of the data transmitting elements 1*a* through 1*l* is biased by a suitable spring to project outwardly of the camera, in a stable projecting position, but is movable inwardly, against the force of the bias spring, to a retracted position.

The lens mount 2 includes an annular surface provided with one or more arcuate slots which have arc centers at the center of the lens mount annular surface and which are adapted to receive loosely one or more of the data transmitting members 1*a* through 1*l* when the lens is mounted at its final position on the camera. For example, the lens mount 2 may be provided with arcuate slots 2*a*, 2*b*, 2*c*, and 2*d*. The arcuate slots 2*a*, 2*b*, and 2*c* may be dimensioned such that each receives loosely a single data transmitting element, while the arcuate slot 2*d* may be dimensioned to receive loosely more than one data transmitting element. The depth of the arcuate slots in the lens mount 2 is such that when the lens is mounted on the camera, the data transmitting elements received within the arcuate slots remain undisturbed in their original positions in which they project outwardly of the camera mount, i.e., the data transmitting elements which are received within the arcuate slots remain in their projecting positions. Meanwhile, those data transmitting elements which are not received within the arcuate slots are pushed into their retracted positions.

The data transmitting elements may be operatively connected to transmit exposure data to the camera by changing between their projecting and retracted positions. For example, each of the data transmitting elements 1*a* through 1*l* may form a part of a switch which closes and opens as the data transmitting element moves between its projecting and its retracted position. In turn, the switch may be connected to insert or remove a resistor or a capacitor forming a part of the circuit of an exposure meter. Thus, depending upon the combination of data transmitting elements which remain in their projecting positions and data transmitting elements which are pressed into their retracted positions, the exposure meter of the camera may receive specific data.

Referring to FIG. 3, $\alpha$ designates the angular width of a data transmitting element with respect to the center of the circular array of data transmitting elements, and $\beta$ designates the angular distance between adjacent data transmitting elements.

Referring to FIG. 4, $\gamma$ designates the angular distance between the two facing circumferential edges of the arcuate slot 2*a*. When the lens is mounted in its final position on the camera body, the angle of tolerance between two reference points, one on the lens mount and one on the camera mount, is $\pm\theta$. When the data transmitting element 1*a* is deviated from a reference point D through an angle $\theta$ in the clockwise direction, it is located in the position indicated by 1*a*', and the data transmitting element 1*b* is of course deviated to 1*b*' accordingly. When the data transmitting element 1*a* is deviated in the counterclockwise direction through $\theta$ to the position indicated by 1*a*'', the element 1*e* is displaced to the position indicated by 1*e*''. From FIG. 4, it is seen that in order that the arcuate groove 2*a* may receive only the data transmitting element 1*a* when the angle of tolerance in mounting the interchangeable lens is $\pm\theta$, the following condition must be satisfied $$\gamma = 2\theta + \alpha \leq \beta$$

Hence, the number of the data transmission members is given by $$n = 360/(2\theta + \alpha)$$

(When $n$ is not an integer, the fraction is discorded.) It is readily seen that $2^n$ bits of information may be transmitted when selected data transmitting elements 1*a*–1*n* cooperate with defined arcuate slots in the mount of a lens mounted on the camera. If the signals transmitted by the data transmission members represent the successive terms of the geometric progression, for example, 2, 4, 8, . . . . with the ratio of 2, the signals representing the successive terms of the arithmetic progression, for example, 2, 4, 6, 8, . . . . with the difference of 2, may be transmitted by the combinations of the data transmission members on the side of the camera body.

It is obvious to those skilled in the art that the required data may be transmitted from the camera body to the interchangeable lens mounted thereon, and vice versa.

From the foregoing description, it is seen that according to the present invention, the number of $2^n$ signals may be selected and transmitted by the combinations of $n$ data transmission members in a simple mechanism. Unlike the prior art systems in which the position or displacement of the data transmission member is detected for data transmission, according to the present invention the transmitted data depends only upon whether the data transmitting elements are moved or not, so that deviations in the final position of an interchangeable lens of the screw-in type mount can be satisfactorily compensated. Furthermore, it is not required to machine the data transmitting elements to a high degree of accuracy so that manufacturing costs may be reduced.

It is also seen that in the invented device the lens need not be mounted on the camera such that there is perfect registration between the two, and that it is possible to transmit data accurately even at relatively wide deviation from perfect registration.

I claim:

1. A camera having a mount for interchangeable lenses and a lens having a mount adapted to mate with the camera mount to secure the lens in a defined final position on the camera, wherein the improvement is in means for information exchange between the camera and a lens mounted thereon in its final position, comprising:

an array of data transmitting elements carried by one of said mounts, each data transmitting element movable between a first and a second position; and displacing means carried by the other mount for placing each of the data transmitting elements in a selected one of its first and second positions when the lens is mounted in its final position on the camera, wherein the data transmitting elements are movable along lines parallel to the optical axis of the lens when the lens is mounted on the camera, wherein the camera mount includes a mount surface from which the data transmitting elements which are in their first positions project outwardly, and the lens mount includes a displacing surface mating with the data transmitting elements when the lens is in its final position on the camera to push inwardly to their second positions selected data transmitting elements, wherein the array of data transmitting elements is a circular array of data transmitting elements which are uniformly spaced from each other, and wherein the displacing surface on the lens mount includes an annular surface having at least one arcuate slot adapted to receive loosely at least one selected data transmitting element when the lens is in its final position on the camera, whereby selected data transmitting elements are received loosely within said arcuate slot and remain in their first positions, while other selected data transmitting elements are pushed inwardly to their second positions by the displacing surface.

2. A camera comprising a camera body having a mount for a lens, a lens having a mount thereon mating with the camera mount to secure the lens in a defined position on the camera body, an array of data transmitting elements carried by one of said mounts and movable toward and away from the other one of said mounts and being biased towards said other one of said mounts, said other mount having a surface bearing against said data transmitting elements to position said data transmitting elements in a first position, said surface having at least one slot therein to receive loosely at least one selected data transmitting element which is moved from said first position to a second position within said slot by the biasing thereof, said mounts being relatively movable to permit the position of said slot to be changed with respect to said data transmitting elements to vary which of said data transmitting elements are moved to said second position thereof.

3. A data transmission device for use with interchangeable-lens-cameras as set forth in claim 2 wherein a plurality of $n$ data transmission means are provided so that the total number of data bits exchanged between the camera body and the interchangeable lens mounted thereon is $2^n$, where $n$ is a positive integer.

4. A camera as in claim 2, in which said mounts are relatively movable in pivotable fashion about an axis perpendicular to said surface.

5. A camera as in claim 4, in which said array of data transmitting elements is arcuate.

6. A camera as in claim 5 in which said surface includes a plurality of arcuate slots.

7. A camera as in claim 6, in which at least some of said slots subtend angles different from each other.

* * * * *